Figure 1:
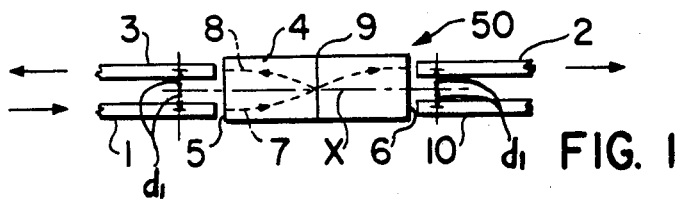

United States Patent [19]

Sugimoto et al.

[11] 4,213,677
[45] Jul. 22, 1980

[54] LIGHT COUPLING AND BRANCHING DEVICE USING LIGHT FOCUSING TRANSMISSION BODY

[75] Inventors: Shigetoki Sugimoto; Ro Ishikawa; Shigeo Matsushita, all of Tokyo, Japan

[73] Assignee: Nippon Selfoc Company, Limited, Tokyo, Japan

[21] Appl. No.: 841,290

[22] Filed: Oct. 12, 1977

[30] Foreign Application Priority Data

Oct. 13, 1976 [JP] Japan .................. 51-122653
Nov. 30, 1976 [JP] Japan .................. 51-144279
Dec. 6, 1976 [JP] Japan .................. 51-163728

[51] Int. Cl.² .............................. G02B 5/14
[52] U.S. Cl. .................... 350/96.18; 350/96.15; 350/96.31
[58] Field of Search .............. 350/96.15, 96.16, 96.18, 350/96.31, 175 GN

[56] References Cited

U.S. PATENT DOCUMENTS 3,937,557  2/1976  Milton .................. 350/96.18

OTHER PUBLICATIONS

A. Ishikawa et al., "Beam Splitting and Coupling Circuits Using a Selfoc Lens", 1977 General National Meeting of the Institute of Japan Electronic Communication Engineering, Mar. 1977, pp. 4–220.

*Primary Examiner*—Rolf G. Hille
*Attorney, Agent, or Firm*—Hopgood, Calimafde, Kalil, Blaustein & Lieberman

[57] ABSTRACT

A light branching and coupling device, having a light focusing transmission body, in which the refractive index distribution of the body gradually decreases from the center towards the periphery of the body in a cross-section thereof, said cross-section being perpendicular to the center axis of the body. The light focusing transmission body has a length substantially equal to a positive integral multiple of ¼ pitch with a reflective surface positioned from an end face of the body at a predetermined distance substantially equal to an odd number multiple of ¼ pitch. Light incident on one of two end faces perpendicular to the center axis of the body propagates undulatingly to the other end face at a predetermined pitch.

15 Claims, 13 Drawing Figures

LIGHT COUPLING AND BRANCHING DEVICE USING LIGHT FOCUSING TRANSMISSION BODY

This invention relates to an optical circuit element for optical communications, and more particularly to a light coupling and branching device using a light focusing transmission body.

Recently, optical communication systems are becoming a practical reality due to recent improvements in optical fibers for we as optical transmission mediums, semiconductor lasers and light emitting diodes for use as light sources, and avalanche photodiodes, and p-i-n photodiodes for use as light detecting means. However to fully realize the potential inherent in an optical communication system, it is essential to provide an optical circuit element, for use as a light coupling device a, light branching device, a light switching device, a light attenuating device etc.

Previous light coupling and branching devices for optical communication systems have consisted of, a combination of individual components such as mirrors and lens systems. One such device is disclosed in a paper entitled "Study on Measurements of Response of Optical Fibers" by Kasahara, published in the Proceedings of the 1976 National Convention of the Institute of Electronics and Communication Engineers of Japan, pgs. 4-200. With such light coupling and branching devices, it is difficult to arrange the respective components in a manner to accomplish the coupling and branching functions, the stability characteristics are easily affected by temperature changes, resulting in poor reliability, and to marked insertion loss, components are of large size and weight and manufacturing costs are high.

In an attempt to overcome these difficulties a light coupling and branching device has been proposed in which polished, slant end faces of two optical fibers are brought into proximity, and the light is reflected onto the polished slant surfaces, (See "Optical Fiber Unidirectional Coupler" by Kuwabara, published on page 1172, Proceedings of the 1976 National Convention of the Institute of Electronics and Communication Engineers of Japan). Another proposal includes a system in which two optical fibers are brought into close proximity, and a portion of the light being transmitted through one of the optical fibers is coupled and branched to the other optical fiber. (See "Fiber-optic Directional Coupler" by J.J PAN, published on page 80, Digest Technical Paper of the Conference on Laser and Electrooptical Systems, San Diego, California, in May 1976.) All of these proposals however fail to optically arrange the components in a manner that will effectively achieve the light coupling and branching functions. In addition, with these conventional proposals, temperature-dependent changes in system characteristics as well as high manufacturing costs are unavoidable.

Accordingly, it is a first object of the present invention to provide a light-weight, miniaturized light branching and coupling device well suited for use in an optical communication system.

It is a second object of the present invention to provide a light branching and coupling device which employs a reduced number of parts, is less costly than prior art devices, has high performance and is retiable.

In accordance with one aspect of the present invention, there is provided a light branching and coupling device which includes: a light focusing transmission body having a refractive index distribution wherein the index is gradually reduced from the center towards the periphery of the cross sectional plane perpendicular to the center axis, two end faces perpendicular to the center axis, having an axial length equal to an integral multiple of approximately ¼ of a pitch at which the light propagates undulatingly, and a reflecting surface disposed at a distance from one of the aforesaid end faces along the center axis thereof, the aforesaid distance being equal to an odd multiple of approximately ¼ pitch.

In accordance with another aspect of the present invention, the use of a small-sized light focusing transmission body allows a reduction in the size of the light branching and coupling device. In addition, the light focusing transmission body functions as a special lens, so that the body may be efficiently coupled to an optical fiber or other optical devices.

The refractive index of the light focusing transmission body is given as follows;

$$n \simeq n_0(1 - g^2 \times {}^2/2) \qquad (1)$$

wherein $n_0$ represents a refractive index on the center axis; g represents a beam focusing parameter, and x represents a distance from the center axis. See for example the paper entitled "Optical Characteristics of a Light Focusing Fiber Guide and Its Applications" by Uchida published on page 606, IEEE Journal of Quantum Electronics, Vol. QE-6, No. 10, October, 1970).

The light incident on the light focusing transmission body at a positional deviation $d_1$, and an angular dieviation $\theta_1$ relative to the center axis of the light focusing transmission body of a length l propagates through the light focusing transmission body and then emanates therefrom at an axial deviation $d_2$ and an angular deviation $\theta_2$. These relationships are illustrated in terms of the following matrix;

$$\begin{pmatrix} d_2 \\ \theta_2 \end{pmatrix} = \begin{pmatrix} \cos gl & \frac{1}{n_0 g} \sin gl \\ -n_0 g \sin gl & \cos gl \end{pmatrix} \begin{pmatrix} d_1 \\ \theta_1 \end{pmatrix} \qquad (2)$$

More particularly when the light is incident on the light focusing transmission body at a given axial and angular deviation, the light travels undulatingly with the pitch being defined as follows:

$$P = 2\pi/g \qquad (3)$$

In addition, the focal length f is equal to:

$$f = (1/n_0 g \; \sin g^l) \qquad (4)$$

and the principal plane is positioned at a distance inwardly from the end face of the light focusing transmission body, as follows:

$$h = (\tan gl/2/n_0 g) \qquad (5)$$

Figure 6:
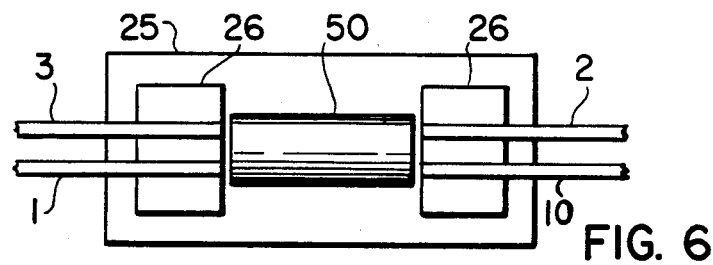
Figure 7A:
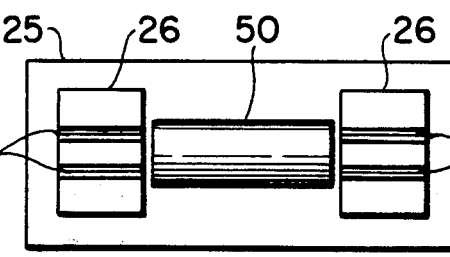
Figure 7B:
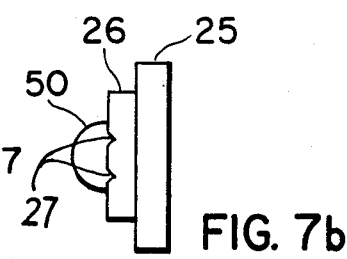

These and other objects, features and advantages of the present invention will be apparent from the following description taken in conjunction with the accompanying drawings, in which FIGS. 1, 2, 3, 4a, 4b and 5 are logitudinal cross-sectional views of the first, second, third, fourth and fifth embodiments of the invention; FIG. 6 is a plan view of the light branching and coupling device used with optical fibers according to the invention; FIGS. 7a and 7b are plan and side views showing a light branching and coupling device used with optical fiber supports according to the present invention; and FIGS. 8, 9, 10 and 11 are block diagrams showing the use of the light branching and coupling device according to the present invention.

A light branching and coupling device 50 shown in FIG. 1 consists of a light focusing transmission body 4 of a length corresponding to approximately ½ pitch, and a reflecting surface 9 positioned approximately ¼ pitch away from the end face 5 of the body 4 and perpendicular to the center axis x. Optical fibers 1 and 3 are positioned near end face 5 at a distance $d_1$ from the center axis in symmetric relation thereto but perpendicular to end face 5. In a similar manner, optical fibers 2 and 10 are positioned close to end face 6 at a distance $d_1$ from the center axis in symmetric relation thereof. Light emanates from the optical fiber 1 and is incident on end face 5 at a right angle thereto and is also made incident on the light focusing transmission body 4. The incident light propagates close to the center axis x, intersect with the center axis, and then propagates away from the center axis x, i.e., the light propagates in an undulating manner as shown by broken line 7, since the light focusing transmission body provides a refractive index distribution as represented by equation (1).

One pitch is defined as a periodic length of the light focusing transmission body, through which the light propagates until it reaches a position where the same positional and angular deviation from the center axis again occurs. One pitch is represented by equation (3). The light incident from the optical fiber 1 intersects the center axis at the reflecting surface 9 which is spaced ¼ pitch therefrom, while the light which is transmitted is coupled efficiently to optical fiber 2, because the length of the light focusing transmission body is ½ pitch. The light 8 which is reflected on the reflecting surface 9 is coupled to optical fiber 3. Accordingly, the light from the optical fiber 1 is branched into optical fibers 3 and 2 by means of the light branching and coupling device. The branching ratio of the light may be varied, as required, by varying the reflectivity of the reflecting surface 9. Reflecting surface 9 may consist of a multi-layered dielectric film such as an interference filter.

Accordingly, a majority of the incident light rays from the optical fiber 1 can be introduced into the optical fiber 2 by reducing the reflecting power of the reflecting surface 9. This also allows the branching of part of the light into the optical fiber 3. Similarly, a majority of the light rays may be introduced into the optical fiber 3 by increasing the reflectivity of the reflecting surface 9, which also allows branching part of the light into the optical fiber 2. In addition, by setting the reflection coefficient of the reflecting surface 9 to approximately ½, the incident light from the optical fiber 1 may be equally divided into the optical fibers 2 and 3. Similarly, it is apparent that the incident light from the optical fiber 10 propagates to the optical fibers 3 and 2, while the incident light from the optical fiber 2 propagates to the optical fibers 1 and 10, and the incident light from the optical fiber 3 propagates to the optical fiber 10 and 1. Accordingly, it is possible to couple the incident light from the optical fiber 1 to the incident light from the optical fiber 10, thereby introducing combined light to the optical fiber 2 or 3.

In the case where the reflecting surface is coated with a multi-layered dielectric film to allow transmission of light having a wavelength $\lambda_1$ while reflecting light having a wavelength $\lambda_2$, the incident beam composed of the light rays of wavelengths $\lambda_1$ and $\lambda_2$ from fiber 1 is demultiplexed at the reflecting surface 9. The demultiplexed light beams of wavelengths $\lambda_1$ and $\lambda_2$ are coupled to fibers 2 and 3, respectively. Thus, the device serves as a light wavelength multiplexing and demultiplexing device.

Figure 2:
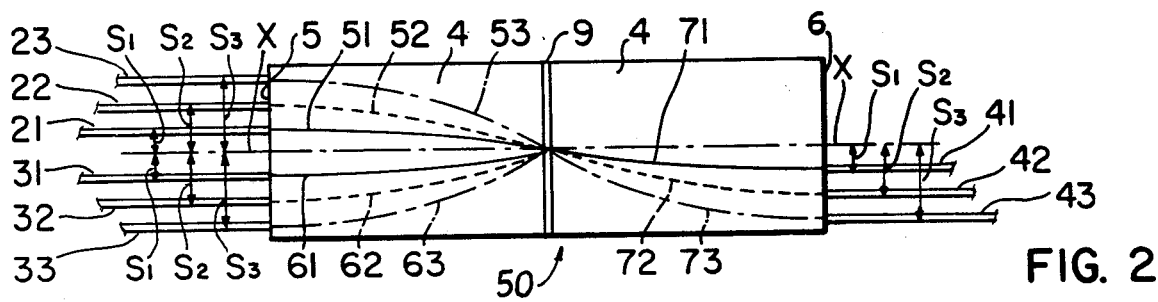

FIG. 2 shows an embodiment of the light branching and coupling device wherein the reflectivity of the reflecting film 9 depends on the incident angle and many optical fiber groups are provided. The light beams 51, 52 and 53 emanating from the fibers 21, 22 and 23 respectively are made incident upon the interference filter 9 with mutually different angles wherein the angles are proportional to the distance from the central axis X. The optimum wavelength of the transmitivity of the interference filter changes with the incident angle. Therefore, the incident light beam 51 composed of the light rays of different wavelengths is demultiplexed into light beams 61 and 62 with mutually different wavelengths and coupled to the optical fibers 31 and 41. Similarly, each of the optical fiber groups 22, 32, 42 and 22, 33, 43 serve independently as light-wavelength demultiplexing or multiplexing devices. The provision of the plurality of fiber groups makes the device adaptable to changes in wavelength of the light rays, which usually results from the replacement of the light source at the transmission end. For example, while the fiber group including the fibers 23, 33 and 43 is adapted to one wavelength, another group consisting of fibers 22, 32 and 42 can be adapted to another wavelength. Thus, if light source dependent wavelength fluctuations are known, the fiber groups can be suitably positioned at the design stage to adapt the device to the known wavelength fluctuations.

Figure 3:
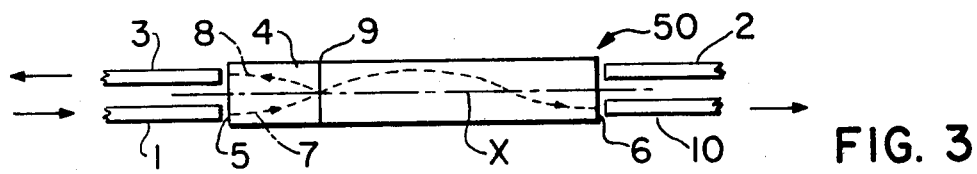

The embodiment of FIG. 3 shows the light focusing transmission body 4 having a total length of 1 pitch, and a reflecting surface 9 spaced ¼ pitch apart from the end face 5. With this arrangement, the light transmitted from optical fiber 1 is transmitted through the reflecting surface 9 and is incident on the optical fiber 10. This occurs because the length of the light focusing transmission body is 1 pitch, and hence the light emanates from the end face 6 at the same positional deviation and angular deviation as in the incident position. In this embodiment, if the optical fiber 1 is used as a main input fiber, and the optical fiber 10 is used as a main output fiber, the fibers may be arranged on the same axis thus facilitating the manufacture of the device as well as improving the practicability thereof. Meanwhile, the light which emanates from the optical fiber 2 and is incident on the end face 6 of the light focusing transmission body 4 propagates to the optical fiber 3 and the optical fiber 10. In this manner light beams may be coupled together by introducing the light from the optical fiber 1 and optical fiber 2 into the light focusing transmission body 4, and emanating this light from the optical fiber 10 and optical fiber 3.

Figure 4A:
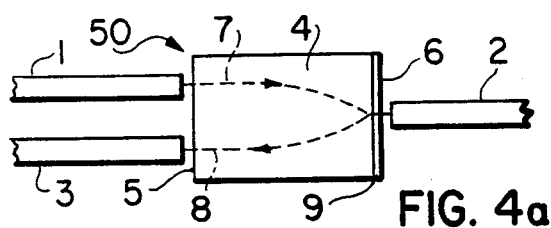

FIG. 4a shows the light branching and coupling device 50 including a light focusing transmission body 4 having a length corresponding to approximately ¼ pitch, and a reflecting surface 9 positioned on the end face 6. An optical fiber 2 is positioned on the center axis in close proximity to end face 6, while two optical fibers 1, and 3 are positioned in parallel with the center axis but spaced therefrom in symmetric relation on the side of end face 5. The light which emanates from the optical fiber 1 and is incident on the light branching and coupling device 50 travels in an undulating manner along the optical path 7 to the center axis. Since the length of the light focusing transmission body 4 is ¼ pitch, as can be seen from the equations (2), (3), the following relationships are given for the end face 6:

$$d_2 \approx 0, \theta_2 \approx -n_0 g d_1 \quad (6)$$

A majority of light rays is emanated from the center axis of the light focusing transmission body 4 at an angle $n_0 g d_1$. And, if this angle is small, then the light will be incident on the optical fiber 2. Part of the light is reflected on the reflecting surface 9, and propagates as a light beam 8 in symmetric relation to the light beam 7 relative to the center axis of the light focusing transmission body 4.

Since the length of the light focusing transmission body 4 is approximately ¼ pitch, the relationship f≈h is established from the equations (4) and (5). Thus, the highest coupling efficiency may be achieved when the end faces of the optical fiber 1, 3 are positioned on the end face 5 of the light focusing transmission body 4.

Figure 4B:
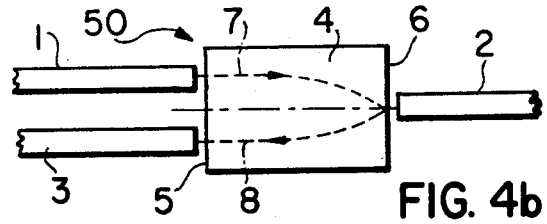

FIG. 4b shows an embodiment wherein a reflecting surface is not provided at the end face 6 as in of FIG. 4 (a), but a reflection is utiled which occurs on a boundary surface due to a difference in refractive indices between the light focusing transmission body 4 and the space outside thereof.

Figure 5:
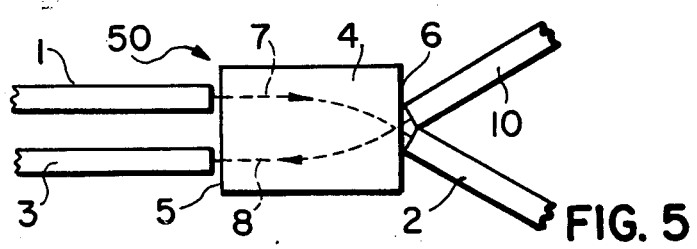

FIG. 5 shows an embodiment wherein the center axis of optical fibers 2 and 10 are positioned at an angle±-$n_0 g d_1$ to the center axis of the end face 6 of the light focusing transmission body, wherein the body has length corresponding to ¼ pitch, thereby allowing the light to be incident on the optical fibers 2 and 10 at maximum efficiency. In this embodiment, a reflecting film is not provided on the end face 6, but instead reflection is provided from a boundary surface. The reflection results from a difference in refractive indices between the light focusing transmission body 4 and a space outside the end face 9 and this reflection is utilized for coupling the reflecting light to the optical fiber 3. In this case, since the reflecting power of the light on the boundary surface is small, it is advantageous to use optical fibers 1 and 2 as main paths, while using optical fiber 3 for monitoring. Similarly optical fibers 3 and 10 can be used as main paths, while using the optical fiber 1 for monitoring.

According to the first, second, third, fourth and fifth embodiments, as described iin accordance with FIG. 1-5, the effective lengths of the light focusing and transmitting body are made equal to ½ pitch, ½ pitch, 1 pitch, ¼ pitch and ¼ pitch, respectively. However, the same branching and coupling functions are achieved, as long as the length of the light focusing transmission body is a positive integral multiple of ¼ pitch, and the reflecting surface is spaced from one end face a distance equal to an odd numbered multiple of ¼ pitch. It is preferred that the effective length of the light focusing transmission body or the distance from the end face to the optical fiber be adjusted depending on the configuration (diverging angle and the like) of the light beam incident on the end face 5 or 6, or depending on the optical characteristics of the reflecting surface 9 (for instance, thickness and the like).

These embodiments may be modified in various forms. For instance, the reflecting surface 9 in the light branching and coupling circuit of FIG. 1 may be so arranged as to intersect with the center axis at an angle of about 45°, optical fibers may be arranged on the center axis of both end faces and, in addition, another optical fiber may be positioneed in close proximity to the reflecting surface at a right angle to the center axis of the light branching and coupling device.

In the aforesaid embodiments, the device according to the invention is made by bonding the end of the light focusing transmission body to the end surface of another light focusing body which is coated with a reflecting film.

The following description illustrates of the use of the light branching and coupling device of FIG. 1. FIG. 6 is a view, in which the light branching and coupling device of FIG. 1 is fixed to a support 25, with optical fiber supporting members 26 being positioned at the opposite ends thereof, while optical fibers 1,3 and 2,10 of suitable lengths are positioned on the supporting member 26, respectively. The light branching and coupling device which has been integrally combined with optical fibers may be used simply by connecting the other end of each optical fiber to another optical circuit.

According to the aforesaid light branching and coupling device, as shown in FIGS. 7a, and 7b, grooves may be provided in the supporting member 26 at a given spacing, so that the light branching and coupling device 50 and the optical fibers may be readity throught into alignment.

In addition, these members are housed in an air tight casing so that the end faces of the respective optical fibers and of the light focusing transmission body may be protected, thereby improving the reliability of the device. Alternatively, the casing may be filled with an optical liquid (for instance, refractive index matching liquid and the like), so that improved reliability due to the protected end face, as well as improved performance due to reduction in reflection loss on the end face may be achieved.

Figure 8:
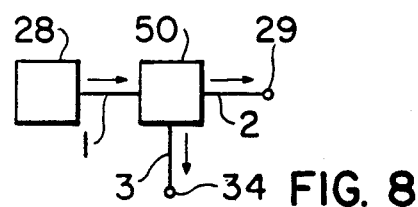
Figure 9:
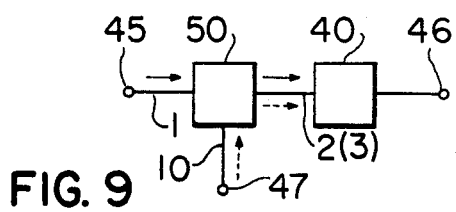
Figure 10:
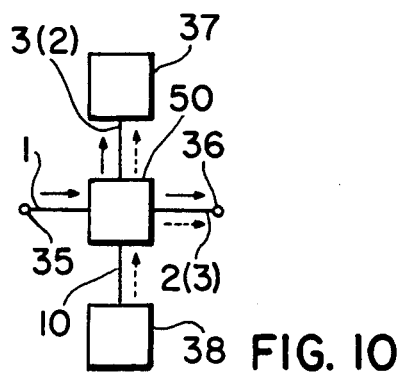
Figure 11:
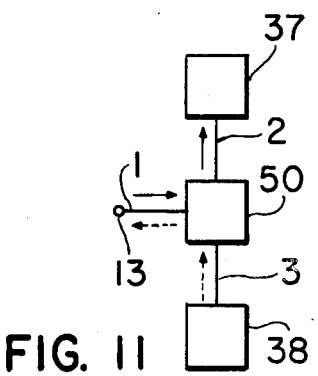

FIG. 8 shows a block diagram wherein the device according to the invention is used for monitoring a transmitted light. A light from a light source 28 in a transmitter is distributed between a transmitting terminal 29 and a monitoring terminal 34 by means of light branching and coupling device 50. FIG. 9 shows, in block diagram from, the device according to the invention when used for inspecting the operation of a receiver. In this embodiment, a receiving input light incident at a receiving terminal 45 and an inspection input light incident at an inspection terminal 47 may be introduced to a detector 40 at the same time by means of light branching and coupling device 50. FIGS. 10 and 11 show block diagrams wherein the device according to the invention is used for the branching and coupling of light. According to the embodiment shown in FIG. 10, a received input light incident at receiving terminal 35 is distributed between a transmitting terminal 36 and a receiver 37 by means of light branching and coupling device 50. Similarly output light from a transmitter 38 is distributed between the transmitting terminal 36 and receiver 37 by means of light branching and coupling device 50, so that the transmitted output light may be transmitted from the transmitting terminal 36, along with the received input light incident at receiving terminal 35. In contrast thereto, according to the embodiment shown in FIG. 11, the received input light incident at the transmitting and receiving terminal 13 is fed to the receiver 37 by means of the light branching and coupling device 50, while an output light of the transmitter 38 is transmitted to the transmission and receiving terminal 13 by means of a light branching and coupling device 50.

Description has been given of the light branching and coupling device according to the invention, which features a light focusing transmission body having a relfecting surface internally thereof, the light branching and coupling device providing small size, light weight, low cost, high performance, high reliability, ease of handling and the like, and thus is will suited for an optical communications system.

Although a specific embodiment of this invention has been shown and described it will be understood that various modifications may be made without departing from the spirit of this invention.

What is claimed is:

1. A light branching and coupling device comprising a light focusing transmission body having a refractive index distribution, in which the refractive index gradually decreases from the center towards the periphery of said body in a cross section thereof perpendicular to the center axis of said body whereby light incident on one of two end faces perpendicular to said center axis of said body propagates undulatingly to the other end face at a predetermined pitch, said light focusing transmission body having a length equal to a positive integral multiple of substantially ¼ pitch; and reflecting means positioned at a predetermined distance from said one end face of said light focusing transmission body along said center axis, said predetermined distance being an odd number multiple of substantially ¼ pitch.

2. A light branching and coupling device as set forth in claim 1, wherein said reflecting means is a flat reflecting surface perpendicular to said center axis.

3. A light branching and coupling device as set forth in claim 2, wherein the length of said light focusing transmission body is substantially equal to ½ pitch, and said reflecting surface is spaced a distance substantially equal to ¼ pitch from an end face of said light focusing transmission body.

4. A light branching and coupling device as set forth in claim 2, wherein the length of said light focusing transmission body is substantially equal to one pitch, and said reflecting surface is spaced a distance substantially equal to ¼ pitch from an end face of said light focusing transmission body.

5. A light branching and coupling device as set forth in claim 2, wherein said reflecting surface comprises a multi-layered dielectric film.

6. A light branching and coupling device as set forth in claim 5, wherein said dielectric film is an interference filter.

7. A light branching and coupling device as set forth in claim 3, wherein two or more optical fibers are positioned on said end faces of said light focusing transmission body in parallel with said center axis at a given distance therefrom but in symmetric relation thereto.

8. A light branching and coupling device as set forth in claim 1, wherein the length of said light focusing transmission body is substantially equal to ¼ pitch, and said reflecting means is provided on one end face of said light focusing transmission body.

9. A light branching and coupling device as set forth in claim 8, wherein there is provided, in combination, two or more optical fibers positioned on said one end face in parallel with said center axis at a given distance therefrom and in symmetric relation thereto, and an optical fiber positioned on said other end face in the direction of a light beam emanating from said one end face.

10. A light branching and coupling circuit as set forth in claim 8, wherein said reflecting means comprises a flat reflecting surface at a right angle to said center axis.

11. A light branching and coupling device as set forth in claim 10, wherein there is provided, in combination, two or more input optical fibers which are positioned on said one end face, having their axes in parallel with said center axis and being at a given distance therefrom; and a single output optical fiber positioned on said other end face and having its axes aligned with said center axis.

12. A light branching and coupling device comprising, a light focusing transmission body having a refractive index distribution n, being defined as:

$$n = n_o(1 - g^2 x^2 / 2)$$

wherein $n_o$ is equal to the refractive index on a center axis of said body, g represents a beam focusing parameter and x represents distance from the center axis, two end faces, included in said light focusing transmission body, and being positioned perpendicular to the center axis of said body, and a reflecting surface, perpendicular to said center axis and positioned a predetermined distance from one end face of said body.

13. A light branching and coupling device in accordance with claim 12, wherein said predetermined distance is substantially equal to an odd number multiple of ¼ pitch.

14. A light branching and coupling device in accordance with claim 13 wherein said light focusing transmission body is of a length substantially equal to a positive integral multiple of ¼ pitch.

15. A light branching and coupling device comprising a light focusing transmission body having a refractive index distribution, in which the refractive index gradually decreases from the center towards the periphery of said body in a cross section thereof perpendicular to the center axis of said body whereby light incident on one of two endfaces perpendicular to said center axis of said body propagates undulatingly to the other end face at a predetermined pitch, said light focusing transmission body having a length equal to substantially ½ pitch; and reflecting means positioned at a predetermined distance from said one endface of said light focusing transmission body along said center axis, said predetermined distance being substantially ¼ pitch.

* * * * *